(12) United States Patent
Constantinides

(10) Patent No.: US 8,126,898 B2
(45) Date of Patent: Feb. 28, 2012

(54) METHOD AND SYSTEM FOR GENERATING SCORED RECOMMENDATIONS BASED ON SCORED REFERENCES

(75) Inventor: Paul Constantinides, San Francisco, CA (US)

(73) Assignee: salesforce.com, Inc., San Francisco, CA (US)

( * ) Notice: Subject to any disclaimer, the term of this patent is extended or adjusted under 35 U.S.C. 154(b) by 449 days.

(21) Appl. No.: 11/593,783

(22) Filed: Nov. 6, 2006

(65) Prior Publication Data

US 2008/0109426 A1 May 8, 2008

(51) Int. Cl.
*G06F 7/00* (2006.01)
(52) U.S. Cl. ........ 707/748; 707/706; 707/723; 707/749; 707/752; 715/838
(58) Field of Classification Search .................. 707/706, 707/723, 748, 749, 752; 715/838
See application file for complete search history.

(56) References Cited

U.S. PATENT DOCUMENTS

| | | | |
|---|---|---|---|
| 7,433,864 B2* | 10/2008 | Malik | 707/3 |
| 2002/0107853 A1 | 8/2002 | Hofmann et al. | |
| 2003/0200198 A1* | 10/2003 | Chandrasekar et al. | 707/1 |
| 2005/0192955 A1* | 9/2005 | Farrell | 707/5 |
| 2005/0278321 A1* | 12/2005 | Vailaya et al. | 707/3 |
| 2006/0080293 A1* | 4/2006 | Nahum | 707/3 |

OTHER PUBLICATIONS

International Search Report PCT/US07/83817.
International Preliminary Report PCT/US2007/083817 dated May 22, 2009, 7 pages.

* cited by examiner

*Primary Examiner* — Wilson Lee
*Assistant Examiner* — Tuan-Khanh Phan
(74) *Attorney, Agent, or Firm* — Haynes Beffel & Wolfeld LLP; Ernest J. Beffel, Jr.

(57) ABSTRACT

A computer method includes receiving a query from a user system; searching a plurality of data objects of a first type for data objects that substantially match the query; generating a first-relevance score for each data object of the second type that is associated with at least one data objects of the first type identified in the search; searching a plurality of data objects of the second type for data objects of the second type that substantially match the query; generating a second-relevance score for each data object of the second type identified in the second search; generating a list of data objects of the second type that are identified in the first and second search steps; ranking the data objects of the second type in the list of data objects based on the relevance scores; and transferring the list of data objects to the user system.

21 Claims, 7 Drawing Sheets

FIG. 6

METHOD AND SYSTEM FOR GENERATING SCORED RECOMMENDATIONS BASED ON SCORED REFERENCES

BACKGROUND OF THE INVENTION

The present invention generally relates to a multi-tenant database system, and more particularly relates to a system and method for providing scored recommendations in response to user queries in a multi-tenant database system.

In a multi-tenant database system, such as the salesforce.com system, a multi-tenant architecture is used wherein customer organizations (i.e., tenants) share database resources in one logical database. A tenant of the system typically retrieves data from and store data on the system using the tenant's user system. The user system might remotely access one of a plurality of server system that might in turn access the multi-tenant database system. Data retrieval from the system might include the issuance of a query from the user system to the multi-tenant database system. The multi-tenant database system might process the request for information received in the query and send to the user system information relevant to the query. The rapid retrieval of accurate information and subsequent delivery of this information to the user system has been and continues to be a goal of administrators of multi-tenant database systems.

Accordingly, it is desirable to provide a multi-tenant database system and a method of use therefore that provide relevant search results in a timely manner where the search results are relevant to a user's query.

BRIEF SUMMARY OF THE INVENTION

The present invention provides a multi-tenant database system and a method of use therefor. More particularly the present invention provides multi-tenant database system and method for providing scored recommendations in response to user queries in a multi-tenant database system.

According to one embodiment of the present invention, a computer method includes receiving a query from a user system and searching a plurality of data objects of a first type for data objects of the first type that substantially match the query. At least one of the data object of the first type is associated with at least one data object of a second type. Each data object of the first type is associated with a query. Each data object of the second type is associated with an answer to a query. The method further includes generating a first-relevance score for each data object of the second type that is associated with at least one data object of the first type that was identified in the searching step.

The method also includes searching a plurality of data objects of the second type for data objects of the second type that substantially match the query, and generating a second-relevance score for each data object of the second type that substantially matches the query. The method may further include generating a list of data objects of the second type that are identified in the search of the data objects of the first type and that are identified in the search of the data objects of the second type; and ranking the data objects of the second type in the list of data objects based on the first and second relevance scores. The list of data objects may be transferred to the user system for use by a user, such as a computer user or a human user. According to a specific embodiment of the present invention, the method further includes generating a case object for the query; receiving a request from the user system for the generation of an association the case object for the query and a set of solution objects in the list of data objects; and forming an association between the case object for the query and the set of solution objects in the list of data objects. The specific embodiment may further include providing for subsequent quires the case object for the query and the set of solution objects in the list of data objects.

According to a specific embodiment of the present invention, the data objects of the first type are case objects, and the data objects of the second type are solution objects. The step of generating the first-relevance score for each of the data objects of the second type identified in the first search includes: i) generating a first-relevance score for each of the data objects of the first type identified in the first search, and ii) assigning the first-relevance score for each of the data objects of the first type to one or more data objects of the second type associated with the data object of the first type.

According to another specific embodiment of the present invention, the step of generating the second-relevance score for each of the data objects of the second type identified in the second search includes adding a weight to each of the second-relevance scores to generate weighted second-relevance scores (WSRSs). Each weight is $\Sigma_C$ (relevance score(C)+ weighting factor)/count(C). $\Sigma_C$ represents a sum over all data object of the first type associated with the data object of the second type. The relevance scores(C) are the relevance scores for each of the data objects of the first type associated with the data object of the second type. The weighting factor is a constant divided by the number of data objects of the first type associated with the data object of the second type. The count (C) is a function of the number of data objects of the first type associated with the data object of the second type.

According to another specific embodiment, if the number of the data objects of the first type associated with the data objects of the second type is less than a low threshold, then the count(C) is the low threshold minus one. If the number of the data objects of the of the first type associated with the data objects of the second type is greater than or equal to the low threshold and is less than or equal to a high threshold, then the count(C) is the number of data objects of the first type associated with the data objects of the second type. If the number of the data objects of the first type is greater than the high threshold, then the count(C) is (the high threshold+(the number of data object of the first type associated with the data objects of the second type−the high threshold)$^{1/2}$).

The step ranking the data objects of the second type in the list of data objects based on the first and second relevance scores includes ranking the data objects of the second type in the list of objects based on i) the first-relevance score for the data objects of the second type identified in the first search and ii) the second relevance score plus the WSRSs. The step of transferring the list of data objects to the user system includes transferring the list of data objects via a web page, via an e-mail, and/or via an instant message. The method may further include, based on a threshold number, purging a set of data object from the list of data object that is transferred to the user system.

According to another embodiment of the present invention, a computer method includes receiving a query from a user system, and generating a query string from the query. The method also includes searching a plurality of case objects for case objects that substantially match the query string. At least one of the case objects is associated with at least one solution object. Each of the case objects is associated with a query. Each of the solution objects is associated with an answer to a query;

According to a specific embodiment, the method further includes generating a first-relevance score for each of the solution objects that is associated with at least one of the case objects identified in the searching step. The method further include searching a plurality of solution objects for solution objects that substantially match the query string, and generating a second-relevance score for each of the solution objects that substantially matches the query. The method further includes generating a list of solution objects identified in the search of the plurality case objects and identified in the search of the plurality of solution objects, and ranking the solution objects in the list of solution objects based on the first and second-relevance scores. The list of data objects may be transferred to the user system for use by a user, such as a computer user or a human user.

The method may further include generating the query string by: i) removing from the query: a) words shorter than a first select length, b) words longer than a second select lengths, which is longer than the first select length, and/or c) stop words; ii) stemming words, and/or iii) performing bi-gram tokenization.

According to another embodiment, a computer system includes a server system configured to:
  receive a query from a user system;
  generate a query string based on the query;
  search a plurality of case objects for case objects that substantially match the query string, wherein:
    i) at least one of the case objects is associated with at least one solution object,
    ii) each of the case objects is associated with a query, and
    iii) each of the solution objects is associated with an answer to a query;
  generate a first-relevance score for each of the solution objects that is associated with at least one of the case objects identified in the searching step;
  search a plurality of solution objects for solution objects that substantially match the query string;
  generate a second-relevance score for each of the solution objects that substantially matches the query;
  generate a list of solution objects identified in the search of the plurality case objects and identified in the search of the plurality of solution objects;
  rank the solution objects in the list of solution objects based on the first and second-relevance scores; and
  transfer the list of solution objects to the user system.

According to a specific embodiment, the server system is configured to generate the query string by: 1) removing from the query: words shorter than a first select length, words longer than a second select lengths, which is longer than the first select length, and/or stop words; 2) stem words, and/or 3) perform bi-gram tokenization.

According to a specific embodiment, the computer system further includes a user system communicatively coupled to the server system, wherein the user system is configured to generate the query and transfer the query to the server system, and receive the list of ranked solution objects from the server system. The computer system may further include a network configured to i) communicatively couple the user system and the server system, ii) transport the query from the user system to the server system, and iii) transport the list of ranked solution objects from the server system to the user system.

A better understanding of the nature and advantages of the present invention may be gained with reference to the following detailed description and the accompanying drawings.

BRIEF DESCRIPTION OF THE DRAWINGS

FIG. 6 is an example of a user interface that includes another list of recommended solution objects where a subset of solution objects in the list have not been purged prior to sending the list to the user.

DETAILED DESCRIPTION OF THE INVENTION

Figure 1:
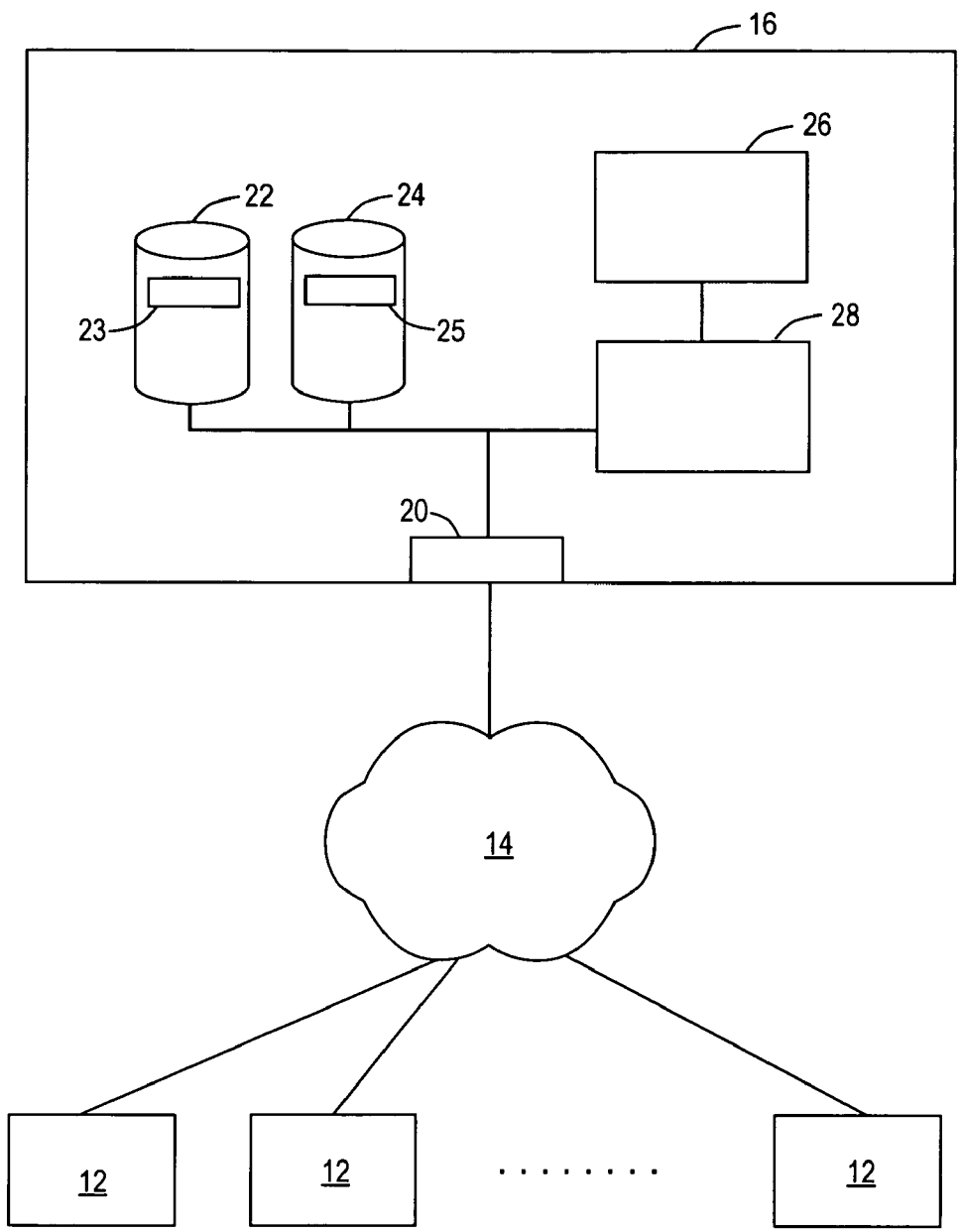
FIG. 1 illustrates an environment where a multi-tenant database system may be used according to one embodiment of the present invention.

FIG. 1 illustrates an environment where a multi-tenant database system might be used. As illustrated in FIG. 1 (and in more detail in FIG. 2) any user system 12 might interact via a network 14 with a multi-tenant database system (MTS) 16. The users of those user systems 12 might be users in differing capacities and the capacity of a particular user system 12 might be entirely determined by the current user. For example, where a salesperson is using a particular user system 12 to interact with MTS 16, that user system has the capacities allotted to that salesperson. However, while an administrator is using that user system 12 to interact with MTS 16, that user system has the capacities allotted to that administrator.

Network 14 can be a LAN (local area network), WAN (wide area network), wireless network, point-to-point network, star network, token ring network, hub network, or other configuration. As the most common type of network in current use is a TCP/IP (Transfer Control Protocol and Internet Protocol) network such as the global internetwork of networks often referred to as the "Internet" that will be used in many of the examples herein. It should be understood, however, that the networks that the present invention might use networks other than the Internet.

User systems 12 might communicate with MTS 16 using TCP/IP and, at a higher network level, use other common Internet protocols to communicate, such as HTTP, FTP, AFS, WAP, etc. As an example, where HTTP is used, a user system 12 might include an HTTP client commonly referred to as a "browser" for sending and receiving HTTP messages from an HTTP server at MTS 16. Such an HTTP server might be implemented as the sole network interface between MTS 16 and network 14, but other techniques might be used as well or instead. In some embodiments, the interface between MTS 16 and network 14 includes load sharing functionality, such as round-robin HTTP request distributors to balance loads and distribute incoming HTTP requests evenly over a plurality of servers. Preferably, each of the plurality of servers has access to the MTS's data.

In some embodiments of the present invention, the system shown in FIG. 1 implements a web-based customer relationship management (CRM) system. For example, MTS 16 may include application servers configured to implement and execute CRM software applications as well as provide related data, code, forms, web pages and other information to user systems 12 and to store to, and retrieve from, a database system related data, objects and web page content. In a multi-tenant system, tenant data is preferably arranged so that data of one tenant is kept separate from that of other tenants so that one tenant does not have access to another's data, unless such data is expressly shared.

One arrangement for elements of MTS 16 is shown in FIG. 1, including a network interface 20, a storage 22 for tenant data 23, a storage 24 for system data 25 (accessible to MTS 16 and possibly multiple tenants), program code 26 for implementing various functions of MTS 16, and a set of processors 28 for executing MTS system processes and tenant-specific processes, such as running applications as part of an application service. A set as referred to herein may include one or more elements.

Several elements in the system shown in FIG. 1 include conventional, well-known elements that need not be explained in detail here. For example, each user system 12 could include a desktop personal computer, workstation, laptop, PDA, cell phone, or any WAP-enabled device or any other computing device capable of interfacing directly or indirectly to the Internet or other network connection. User system 12 typically runs an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system, such as a human user) of user system 12 to access, process and view information and pages available to it from MTS 16 over network 14. Each user system 12 also typically includes one or more user interface devices, such as a keyboard, a mouse, a touch screen, a pen or the like, for interacting with a graphical user interface (GUI) provided by the browser on a display (e.g., monitor screen, LCD display, etc.) in conjunction with pages, forms and other information provided by MTS 16 or other systems or servers. As discussed above, the present invention is suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium processor or the like. Similarly, MTS 16 (and additional instances of MTS's, where more than one is present) and all of their components might be operator configurable using application (s) including computer code run using a central processing unit such as an Intel Pentium processor or the like, or multiple processor units. Computer code for operating and configuring MTS 16 to intercommunicate and to process web pages and other data and content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, Java, JavaScript, any other scripting language, such as VBScript and many other programming languages as are well known.

According to one embodiment, MTS 16 is configured to provide web pages, forms, data, such as answers to queries, and other content to user systems 12 to support the access by user systems 12 as tenants of MTS 16. As such, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). Each MTS may include one or more logically and/or physically connected servers distributed locally or across a number of disparate geographic locations. Additionally, the term "server" is meant to include a computer system, including processing hardware and process space(s), and an associated storage system and database application (e.g., RDBMS) as is well known in the art. It should also be understood that "server system" and "server" are often used interchangeably in the art and herein. Similarly, the databases described herein can be implemented as single databases, a distributed database, a collection of distributed databases, a database with redundant online or offline backups or other redundancies, etc., and might include a distributed database or storage network and associated processing intelligence.

Figure 2:
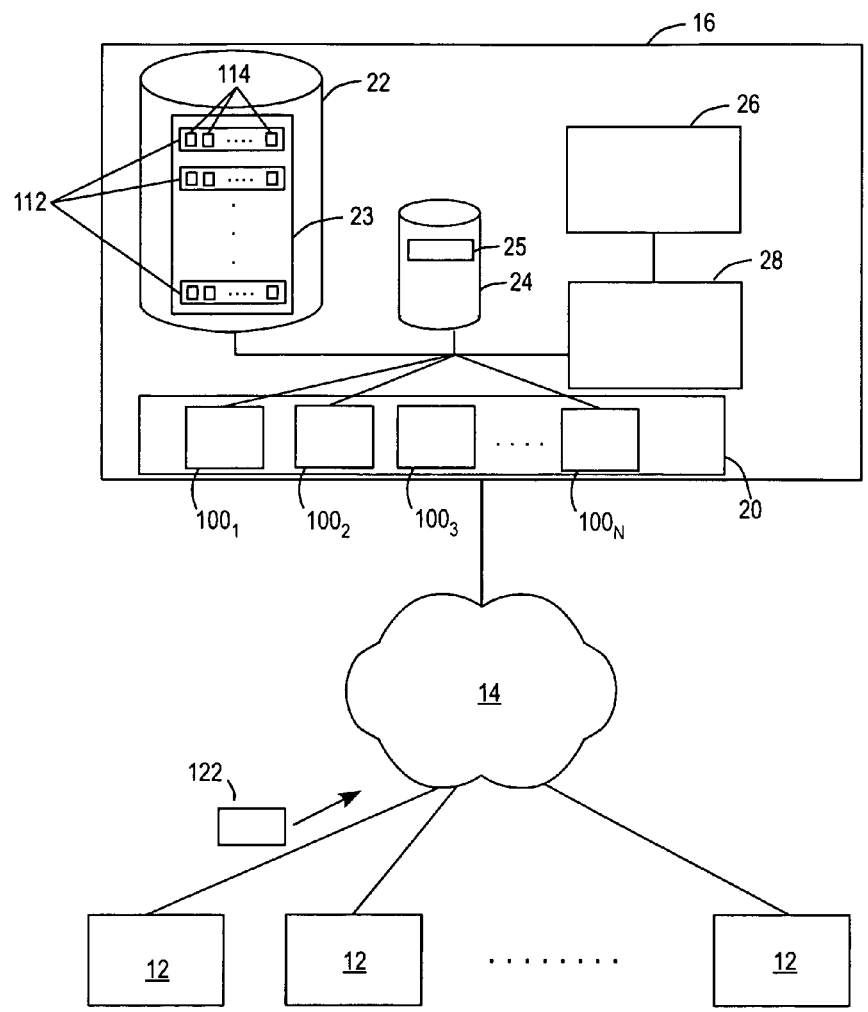
FIG. 2 illustrates elements of a multi-tenant database system and various interconnections thereof according to one embodiment of the present invention.

FIG. 2 illustrates elements of MTS 16 and various interconnections thereof in more detail. In this exemplary embodiment, network interface 20 includes a set of HTTP application servers 100. Each application server 100 may be configured to access storage 22 and the tenant data therein, and access storage 24 and the system data therein to serve requests of user systems 12. The tenant data 23 might be divided into individual tenant storage areas 112, which can be either a physical arrangement or a logical arrangement of data. Within each tenant storage area 112, user storage 114 might be allocated for each user. The tenant data and the system data may be stored in various databases, such as one or more Oracle™ databases.

Each application server 100 may be communicatively coupled to storage 23 and 25 via different types of network connections. For example, one server 100₁ might be coupled to storage 23 and 25 via the Internet 14, another server 100₂ might be coupled via a direct network link, and another server 100₃ might be coupled by yet a different network connection. Transfer Control Protocol and Internet Protocol (TCP/IP) is one set of protocols for communicating between servers 100 and storage 23 and 25. However, it will be apparent to one skilled in the art that other transport protocols may be used to optimize the system depending on the network interconnect used.

According to one embodiment, each application server 100 is configured to handle requests for any user/organization. Because it is desirable to be able to add and remove application servers from the server pool at any time for any reason, there is preferably no server affinity for a user and/or organization to a specific application server 100. In one embodiment, therefore, an interface system (not shown) implementing a load balancing function (e.g., an F5 Big-IP load balancer) is communicably coupled between the servers 100 and the user systems 12 to distribute requests to the servers 100.

According to one embodiment, client systems 12 communicate with application servers 100 to request and update the system data and/or the tenant data contained in the database(s) of MTS 16. The client systems may issue quires 122 to the databases to request or update data at the request of a user.

According to one embodiment, the tenant data and/or the system data may include data objects. Two different types of data objects included in the tenant data are "case" objects and "solution" objects. The tenant data for each tenant may include one or more sets of case objects 116 and one or more sets of solution objects 118. While one set of case objects and one set of solution objects are shown in FIG. 2, the databases may include a plurality of these sets.

Figure 3:
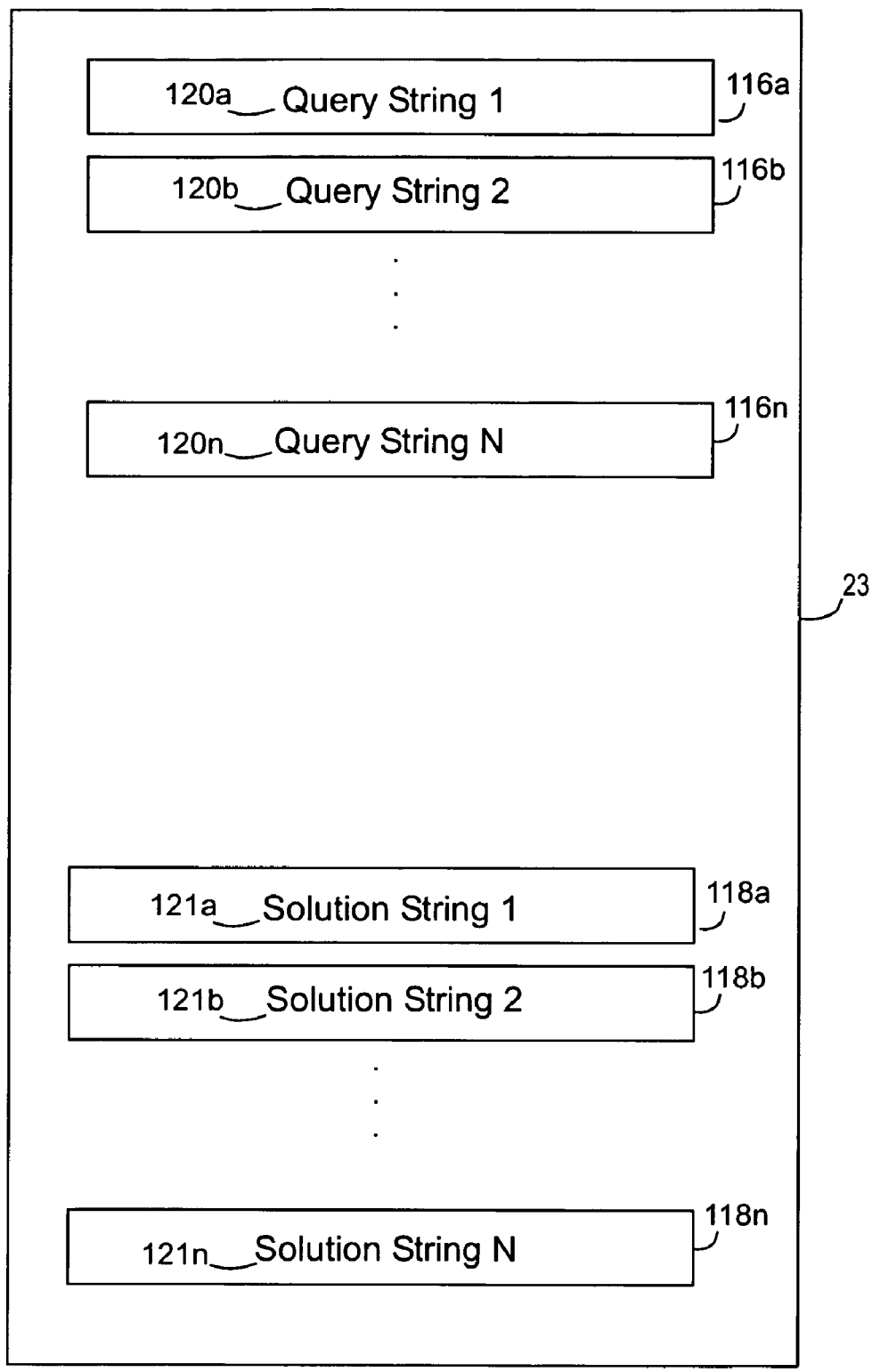
FIG. 3 is a simplified schematic of a set of case objects and a set of solution objects 118 according to one embodiment of the present invention.

FIG. 3 is a simplified schematic of the set of case objects 116 and the set of solution objects 118 according to one embodiment of the present invention. Each case object is labeled with its base reference number 116 and an alphabetic suffix, and each solution object is labeled with its base reference number 118 and an alphabetic suffix. Each case object may include a query string 120, and each solution object may include a solution string 121. Each query string is labeled with its base reference number 120 and an alphabetic suffix, and each solution string is labeled with its base reference number 121 and an alphabetic suffix. Each query string included in a case object might be based on a query 122 issued by one of the user systems 12. Each solution string included in a solution object might be a solution for a query. Any given case object may be associated with one or more solution objects. For example, a number of case objects might include query strings for which a given solution string provides a solution. A given user system might receive an input entered by a user and generate a query based on the user input. The given user system may thereafter transmit the query to MTS 16 via the network. A user using a user system may enter the input for the query into the user system via one of the input devices (e.g., keyboard, microphone, etc.) of the user system. A query string 120 in a given case object 116 might include a query string that is based on string included query 122 or might include an edited version the string in query 122.

Query 122 may be a request for information, such as for information for a service, a product, general knowledge, a feature or the like. For example, an owner or a licensee of a product may have a question about how to operate the product. For example, query 122 may include the string "how can I place my digital voice recorder into editing mode during playback."

According to one embodiment, MTS 16 after receiving query 122 may be configured to parse and edit the query to generate query string 120. According to one embodiment, MTS 16 may be configured to remove "short" words from the query. A short word might be a word that is a threshold length of characters or shorter. For example, the threshold length might be one character, and words such as "a" and "I" may be removed from the query. "Long" words might also be removed from the query. A long word is a word that equal to or greater than a threshold length of characters. For example, the threshold length of characters might be ten characters or the like. The threshold length for long words might be set so that MTS 16 removes URLs and the like from the query. According to a further embodiment, "stop" words are removed from the query. Stop words are words that have little or no semantic meaning. For example, words such as "a", "that", "it", "the", "has", "was", etc. may be removed from the query to generate a query string 120. MTS 16 may also be configured to "stem" words. That is suffixes and/or prefixes may be removed from a word to "cut" the word down to its stem. For example, the word "running" may be cut down to the word "run," or the word "blocked" may be cut down to the word "block." It should be understood that the foregoing stemming examples are exemplary and that MTS 16 may be configured to stem a variety of words. Stemming may be performed according to the Porter stemming algorithm. The Porter stemming algorithm is well known in the art and will not be described herein. MTS 16 may further be configured to perform bi-gram tokenization for Chinese, Japanese, and Korean languages. According to the example being considered, MTS 16 may be configured to perform one or more of the foregoing described editing functions to edit the query "how can I place my digital voice recorder into editing mode," to generate the query string "place digital voice recorder edit mode." MTS 16 may be configured to perform searches of the data objects relatively more efficiently if queries are edited as described above.

According to one embodiment, the solution objects include answers to queries. For example, a solution object might include a solution to the query "how can I place my digital voice recorder into editing mode." According to the example being considered, a given solution object might include a string that indicates that "the record button must be pressed with the play button for the voice recorder to enter editing mode during playback."

MTS 16 may be configured to search the solution objects for strings that match query string 120. MTS 16 might also be configured to search the solution objects for stings that match a portion of query string 120 or match derivates of query string 120. A derivative match might include strings that have root words that match but have different suffixes, prefixes, tenses, or the like. A string in a case object or solution object is referred to herein as substantially matching another string, such as a query string, if the string of the case object or the solution object matches the query string, matches a portion of the query string, includes derivative of one or more terms in the query string, the query string includes derivative of the string, the sting includes differing tenses of terms in the query string or the like. The search over solution objects is referred to herein as a direct search. MTS 16 may also be configured to search for other case objects for query strings that match query string 120. MTS 16 might also be configured to search (or issue a search command to search) the case objects for strings that substantially match query string 120. The search over case objects is referred to herein as an indirect search. A search over solution objects associated with case objects identified in an indirect search of case objects may similarly be referred to herein as an indirect search.

MTS 16 may be configured to generate a direct-relevance score for each solution object identified in the direct search. A direct-relevance score indicates how closely a string of a given solution object matches query string 122 of the case object. The direct-relevance scores may be Lucene scores, which are generated by the open source code of the Apache Software Foundation. Lucene scores and Lucene scoring are well understood by those of skill in the art and will not be described in detail herein except to note that Lucene scores are based on tf-idf (term frequency inverse document frequency, a standard information retrieval metric).

According to the example being considered, if a solution object is related to a digital recorder, and more specifically is related to entering the edit mode during play back, the case object might be assigned a relatively high direct-relevance score. For example, this solution object might be assigned a direct-relevance score of 0.90 out of a possible score of 0-1. Another solution object that relates to the general operation of the digital recorder but does not relate specifically to entering the edit mode during play back, might have a lower direct-relevance score, e.g., 0.25. Another solution object that relates to the type of memory the digital recorder uses might have an even lower direct-relevancy score, e.g., 0.10.

MTS 16 may also be configured to generate an indirect-relevance score for each case object identified in the indirect search. An indirect-relevance score indicates how closely the string of a given case object, which was identified in the indirect search, matches query string 122 of the case object associated with the user (i.e., associated with input the user entered in the user system for the generation of the query, the query string, and the case object including the query string). The indirect-relevance scores may be Lucene scores (described above).

According to one embodiment, one or more case objects may be previously associated with a given solution object. The associations may be generated at the request of a human user, such as an administrator of MTS 16. A user of a user system 12 may also request the formation of an association via the user system. The user may request the formation of an association if the user is presented via the user system a solution object that the user finds relevant to the user's query 122. Associations between a solution object and a set of case objects might be stored in the database of data pointers or the like. The presentation of solution objects relevant to the user's query is described in further detail below. An indirect-relevance score that is assigned to a given case object may be assigned to one or more solution objects that are associated with the given case object.

MTS 16 may be configured to generate two ranked lists of search results. A first list of ranked search results is generated based on the direct search, and a second list of ranked search results is based on the indirect search. The first ranked list may include one or more solution objects that were identified in the direct search. The second ranked list may include one or more search results that were identified in the indirect search. The solution objects in these ranked lists may be ranked based on their relevance scores where solution objects having relatively high relevance score are ranked higher than solution objects having relatively lower relevance scores. For example, a solution object having a highest relevance score may be positioned at the top or front of a list of solution objects. Solution objects having decreasing scores may be positioned "below" the solution object having the highest relevance score and may be positioned in the list in descending order according to their relevance scores.

According to one embodiment, solution objects identified in the direct search are purged from the first list of ranked search results based on the comparison of a direct-threshold score to the direct-relevance scores of the solution objects. MTS 16 may be configured to compare the scores and purge the solution objects. For example, solution objects having direct-threshold scores at or below a direct-threshold score of say 0.2 may be not be placed in the first list, whereas solution objection having direct-relevance scores above 0.2 may be placed in the first list.

According to one embodiment, case objects identified in the indirect search are purged from the list of ranked search results based on the comparison of an indirect-threshold score to the indirect-relevance scores of the case objects. MTS 16 may be configured to compare the scores and purge the case objects. For example, case objects having direct-relevance scores at or below a direct-threshold score of say 0.3 may be not be placed in the list, whereas case objection having direct-relevance scores above 0.3 may be placed in the second list.

According to one embodiment, the number of solution objects from both the indirect search and the direct search that are placed in the first list and second list are limited based on a limiting threshold. For example, the number of solution objects in the first list may be limited to a limiting threshold of 1500. The number of solution objects in the second list may similarly be limited to the limiting threshold of 1500. The top scoring 1500 solution objects may be placed in the first and second lists. Moreover, in an indirect search, the top scoring 1500 case objects may be retained prior to identifying the solution objects associated with the retained case objects. Case objects and solution objects exceeding 1500 may simply be purged from the query results. The limiting threshold for the first and second lists may not be the same value.

According to one embodiment, the first list and the second list are combined by MTS 16 to generate a single list of recommended solution objects. The list of recommended solution objects may then be transmitted to the user via the user's user system. The solution objects may be ranked in the list of recommended solution objects based on the direct and indirect-relevance scores for the solution objects. A solution objects having a highest relevance score (whether a direct-relevance score or an indirect-relevance score) may be ranked highest in the list of recommended solution objects. Solution objects having relevance score (whether direct or indirect relevance score) less than the highest relevance score may be ranking in decreasing order in the list of recommended solution objects. The recommended solution list may be transmitted to the user's user system in an e-mail, served on a web page, provided in an instant message or the like.

Prior to forming the list of recommended solutions, a weight may be added to each indirect-relevance score to increase or decrease the relative importance of the solution objects identified in the indirect search relative to the solution objects identified in the direct search. The indirect-relevance score plus the weight is referred to as the weighted indirect-relevance score (WIRS). The WIRS may be written as:

$$WIRS = \text{direct-relevance score} + \Sigma_C (\text{indirect-relevance score}(C) + \text{weighting factor})/\text{count}(C).$$

The weight for an indirect-relevance score is the sum term in the above equation. The sum over C is the sum of indirect-relevance scores for each case object that is associated with a given solution object. For example, if ten case objects are associated with the given solution object, then the ten indirect-relevance scores for these case objects are summed. The weighting factor in the sum term may be a constant divided by the number references from case objects to solution objects that have been identified. According to one embodiment, the constant is 0.3, which raises the importance of an indirect search result relative to a direct search result. In the example being considered, the weighting factor is 0.3/10=0.003. The denominator count(n) of the sum term may be determined from one of three functions. Table 1 below shows the three functions.

TABLE 1

| Count(n) = | low threshold − 1 | for n < than a low threshold |
| | n | for low threshold $\leq$ n $\leq$ high threshold |
| | high threshold + (n − high threshold)$^{1/2}$ | for n > high threshold |

Figure 4:
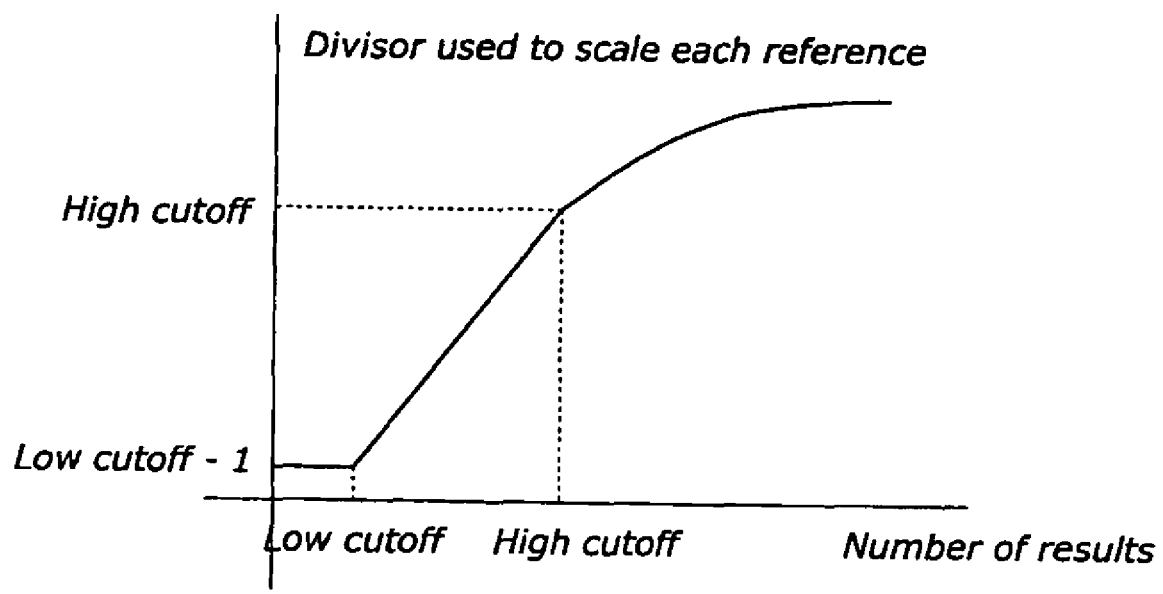
FIG. 4 is a simplified graph of the count(n) that is the denominator of the summation.

FIG. 4 is a simplified graph of the denominator count(n). The left section 130 of the graph below the low threshold represents a constant weight (i.e., low threshold −1). The middle section 132 of the graph between the low and high thresholds represents a linearly increasing weight (i.e., n). The right section 134 of the graph above the high threshold represents weights that increase along a curve and is the function: high threshold+(n−high threshold)$^{1/2}$. The constant portion of the denominator provides that the weight will not be strongly influenced for a solution object having a relatively low number case objects that are associated with the solution object. Similarly, the curving portion (e.g., damping function) of the denominator provides a large number of indirect search results do not excessively diminish the indirect search reference score (e.g., due to the large value of the count function).

The list of recommend solution objects may be formed by MTS 16 based on the direct-relevance scores for the solution objects identified in the direct search and based on the WIRSs for the solution objects identified in the indirect search. The solution objects are ranked in the list according to these scores, with the solution object having the highest score ranked "highest" in the list and solution objects having decreasing scores ranked in a decreasing order from the highest ranking solution object.

According to one embodiment, a user via their user system is proved with a limited number of solution objects from the list of recommended solution objects. For example, if the number of solution objects in the list of recommended solution objects exceeds a threshold number, the solution objects having the lowest rank and that exceed the threshold number may be purged from the list. Alternatively, an administrator of MTS 16 may be provided with the entire list of recommended solution objects without any of the solution objects being purged from the list.

Figure 5:
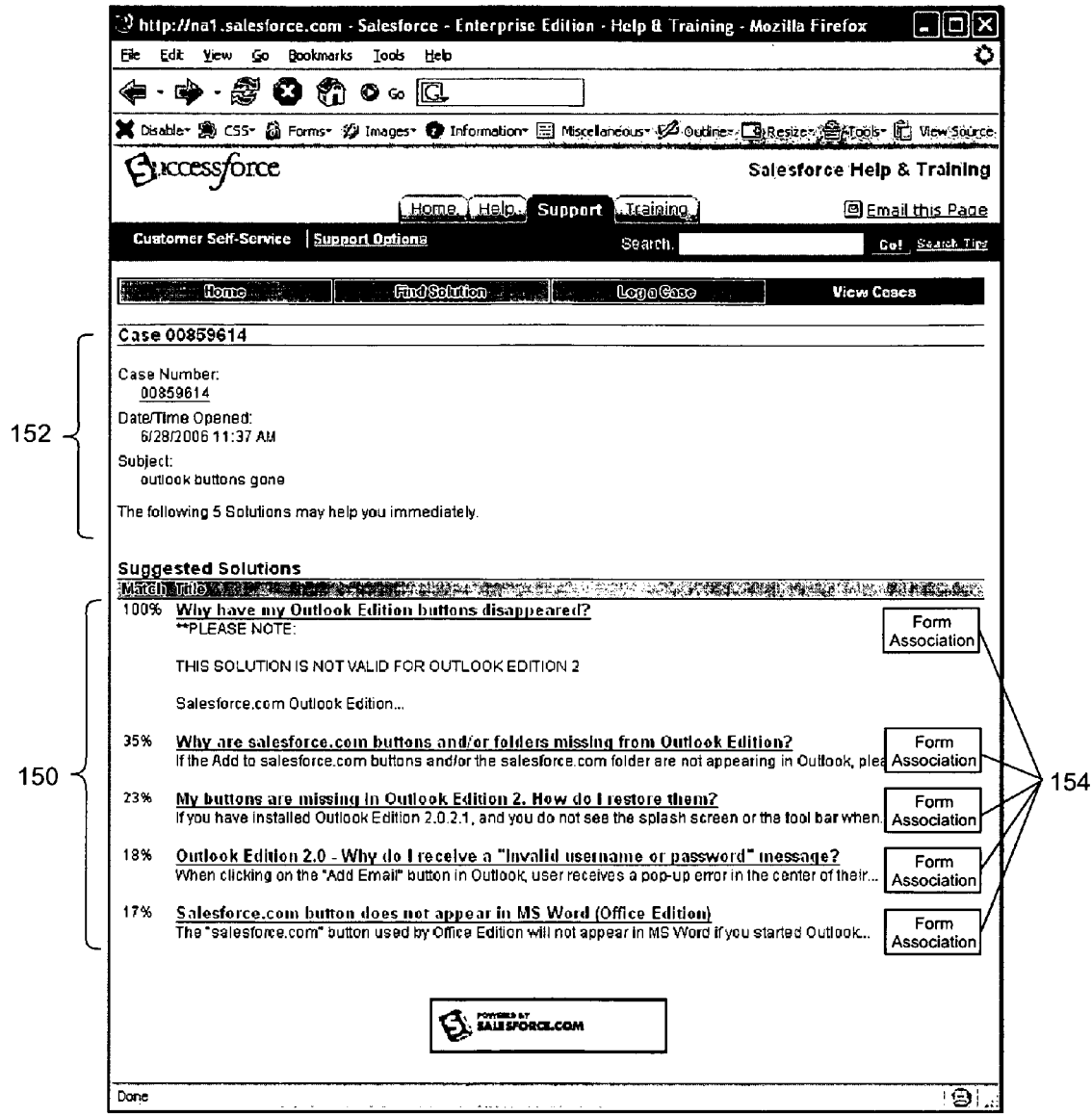
FIG. 5 is an example of a user interface that includes a list of recommended solution objects that are provided to a user via the user system.

FIG. 5 is an example of a user interface that includes a list of recommended solution objects 150 that are provided to a user via the user's user system. List 150 may be an edited list of solution objects where a number of solution objects have been purged from a larger list to generate list 150. The user interface might also include a set of information 152 that is relevant to the user's query 120. The user to whom this user interface is presented might be a user who is a subscriber (or tenant) to MTS 16.

According to one embodiment, the user interface of FIG. 5 is configured to provide the user with an screen option to request the generation of an association between the user's case object (i.e., the case object associated with the user's query) and one or more of the solution objects presented on the user interface. The user interface may include a set of screen buttons 154 or the like that are configured to permit the user to request MTS 16 to generate the association. The request for the generation of the association may be sent from the user's user system to MTS 16 where the association is generated and stored in the database associated with the tenant data, the system data, and/or other data. According to a specific embodiment, user's who are subscribers to MTS 16 are permitted to request the generation of one association between one solution object and the user's case object. The association between the user's case object and the solution object may be stored in tenant storage area 112. The user's case object and/or the solution object associated therewith may also be stored in the tenant storage area 112. The user's case object and the solution object associated therewith may be made available in subsequent direct searches and/or indirect searches based on a new query 122. According to this embodiment, uses can build up the database with associations between queries and solutions, so that subsequent users can benefit from the previous users successful query session.

Figure 6:
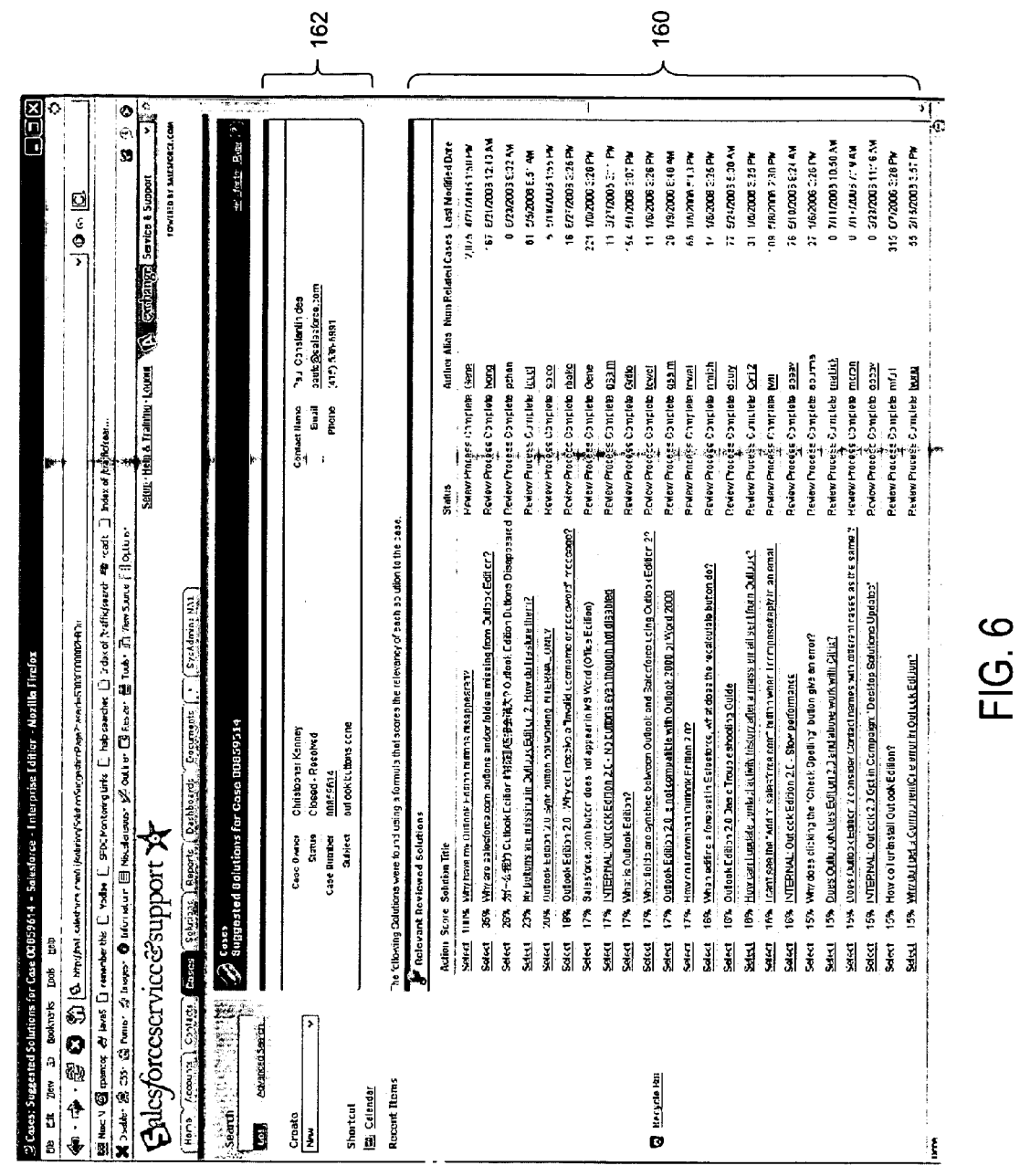

FIG. 6 is an example of a user interface that includes another list of recommended solution objects 160 where the solution objects in the list have not been purged prior to sending the list to the user's user system. This user interface might also include a set of information 162 that is relevant to the user's query 120. The user to whom this user interface is presented might be a user who is a system administrator, a customer care representative or the like of MTS 16. The user interface of FIG. 6 may include a set of screen buttons (not shown) or the like that are configured to permit the user to request the generation of one or more associations between the solution object presented in the list and the case object associated with the list. If the user is a system administrator, the user may be permitted to request the generation of an unlimited number of associations.

Figure 7:
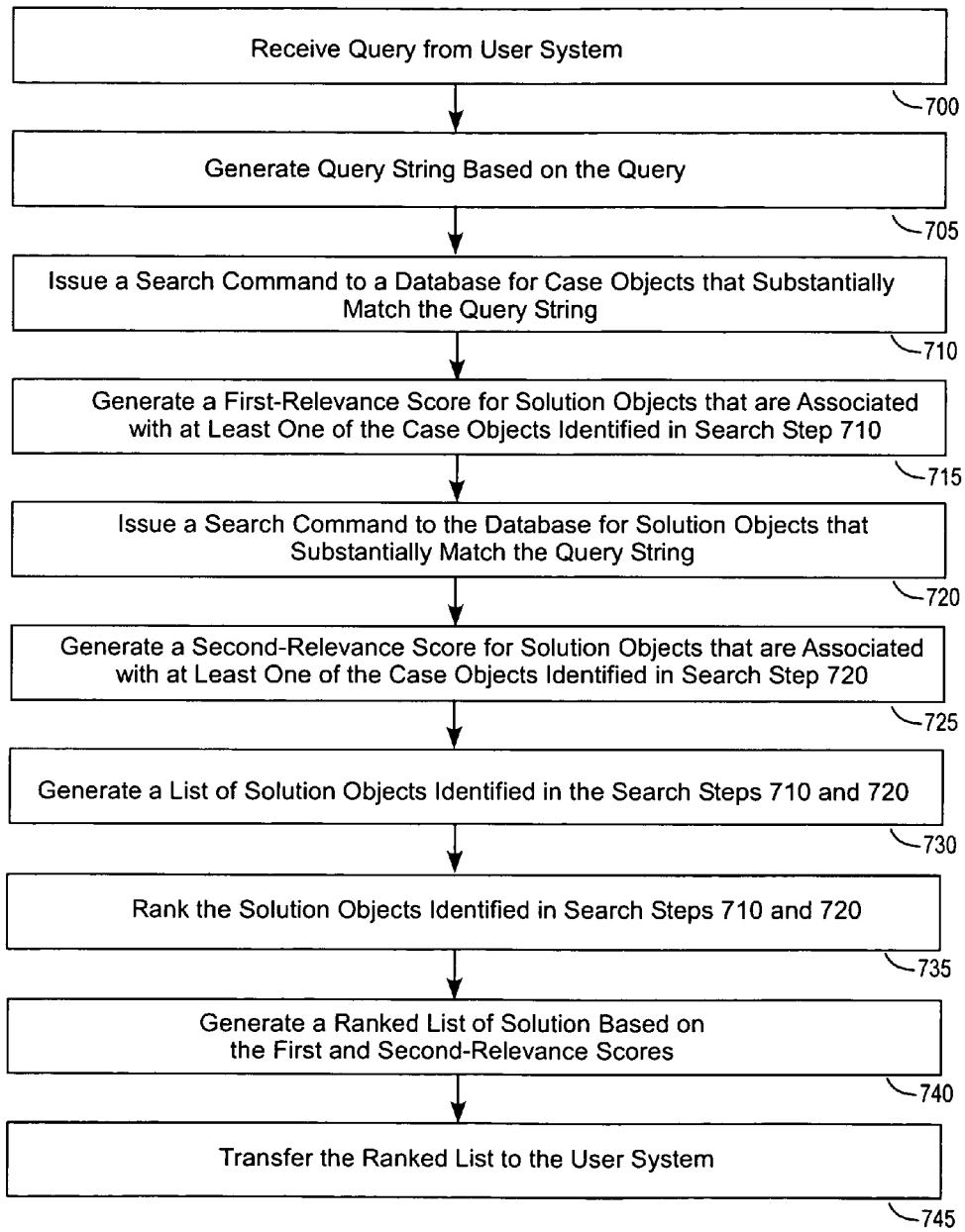
FIG. 7 is a high level-flow chart having steps for a search method according to one embodiment of the present invention.

FIG. 7 is a high level-flow chart that includes steps for a search method according to one embodiment of the present invention. The high-level flow chart is exemplary the embodiment. Those of skill in the art will recognize various alternate embodiments of the method where steps are added, deleted, and/or modified. The alternate embodiments are considered to be within the scope and purview of the present invention. The embodiment of FIG. 7 should not be viewed as limiting the invention as defined by the claims. According to the embodiment, at a step 700, a server system (e.g., MTS 16) is configured to receive a query from a user system. Information for the query may be entered into the user system by a user of the user system. At step 705, a query string is generated from the query. The query might include a string that is based on the information entered by the user in the user system. At step 710, the server system is configured to issue a search command of a database for case objects that substantially match the query string.

According to one embodiment of the method, i) any given case objects is associated with at least one solution object, ii) each of the case objects includes a sting that represents a query, and iii) each of the solution objects includes a string that represents an answer to a query. At step 715, a first-relevance score (e.g., a indirect-relevance score) is generated for and assigned to each of the solution objects that is associated with at least one of the case objects identified in the searching step 710.

At step 720, the server system is configured to issue a search command of a database for solution objects that substantially match the query string. At step 725, a second-relevance score is generated for each of the solution objects having a string that substantially matches the query string.

At step 730, a list of solution objects is generated for solution objects that were identified in the search of step 710, and that were identified in the search of step 720. At step 735, the solution objects identified in the search steps are ranked, and a list of ranked solution objects is generated at step 740. The ranking of the solution objects is based on the first and second-relevance scores. At step 745, the ranked list of solution objects is sent from the server system to the user system.

Further embodiments can be envisioned to one of ordinary skill in the art after reading this disclosure. In other embodiments, combinations or sub-combinations of the above disclosed invention can be advantageously made. For example, while the foregoing exemplary embodiments have been described as being applicable to case objects and solution objects, the sets of data objects managed by MTS 16 may be nearly any types of data objects, such as opportunity objects and knowledge objects, feature request objects and feature objects or the like. A user request might be for feature information or opportunity information, and MTS 16 may be configured to generate recommendation lists of feature objects and knowledge objects, respectively, which are relevant to the user request. The specification and drawings are, accordingly, to be regarded in an illustrative rather than a restrictive sense. It will, however, be evident that various modifications and changes may be made thereto without departing from the broader spirit and scope of the invention as set forth in the claims.

What is claimed is:

1. A computer method comprises:
receiving a query from a user system;
generating a query string that substantially matches characters of the query;
searching a plurality of data objects of a first type for data objects of the first type that substantially match the query wherein i) each data object of the first type is associated with at least one data object of a second type, ii) each data object of the first type includes a query, and iii) each data object of the second type includes an answer to a query;
generating a first-relevance score for each data object of the second type that is associated with at least one of the data objects of the first type that was identified in the searching step;
searching a plurality of data objects of the second type for data objects of the second type that substantially match the query string;
generating a second-relevance score for each data object of the second type that substantially matches the query;
generating a list of data objects of the second type that are identified in the search of the data objects of the first type and that are identified in the search of the data objects of the second type;
ranking the data objects of the second type in the list of data objects based on the first and second relevance scores; and
transferring the list of data objects to the user system.

2. The method of claim 1, wherein the data objects of the first type are case objects.

3. The method of claim 2, wherein the data objects of the second type are solution objects.

4. The method of claim 3, further comprising:
generating a case object for the query;
receiving a request from the user system for the generation of an association the case object for the query and a set of solution objects in the list of data objects; and
forming an association between the case object for the query and the set of solution objects in the list of data objects.

5. The method of claim 4, further comprising providing for subsequent quires the case object for the query and the set of solution objects in the list of data objects.

6. The method of claim 1, wherein the step of generating the first-relevance score for each of the data objects of the second type identified in the first search includes:
i) generating a first-relevance score for each of the data objects of the first type identified in the first search, and
ii) assigning the first-relevance score for each of the data objects of the first type to one or more data objects of the second type associated with the data object of the first type.

7. The method of claim 1, wherein the step of generating the second-relevance score for each of the data objects of the second type identified in the second search includes adding a weight to each of the second-relevance scores to generate weighted second-relevance scores (WSRSs).

8. The method of claim 7, wherein each weight is C (relevance score (C)+weighting factor)/count (C).

9. The method of claim 8, wherein:
i) C represents a sum over all data object of the first type associated with the data object of the second type,
ii) the relevance scores (C) are the relevance scores for each of the data objects of the first type associated with the data object of the second type,
iii) the weighting factor is a constant divided by the number of data objects of the first type associated with the data object of the second type, and
iv) the count (C) is a function of the number of data objects of the first type associated with the data object of the second type.

10. The method of claim 9, wherein:
i) if the number of the data objects of the first type associated with the data objects of the second type is less than a low threshold, then the count (C) is the low threshold minus one
ii) if the number of the data objects of the of the first type associated with the data objects of the second type is greater than or equal to the low threshold and is less than or equal to a high threshold, then the count (C) is the number of data objects of the first type associated with the data objects of the second type, and
iii) if the number of the data objects of the first type is greater than the high threshold, then the count (C) is (the high threshold +(the number of data object of the first type associated with the data objects of the second type −the high threshold)½).

11. The method of claim 7, wherein the step ranking the data objects of the second type in the list of data objects based on the first and second relevance scores includes ranking the data objects of the second type in the list of objects based on i) the first-relevance score for the data objects of the second type identified in the first search and ii) the second relevance score plus the WSRSs.

12. The method of claim 1, wherein the step of transferring the list of data objects to the user system includes transferring the list of data objects via a web page, via an e-mail, and/or via an instant message.

13. The method of claim 1, further comprising, based on a threshold number, purging a set of data object from the list of data object that is transferred to the user system.

14. A computer method comprising:
receiving a query from a user system;
generating a query string from the query;
searching a plurality of case objects for case objects that substantially match the query string, wherein:
i) at least one of the case objects is associated with at least one solution object,
ii) each of the case objects includes a query, and
iii) each of the solution objects includes an answer to a query;
generating a first-relevance score for each of the solution objects that is associated with at least one of the case objects identified in the searching step;
searching a plurality of solution objects for solution objects that substantially match the query string;
generating a second-relevance score for each of the solution objects that substantially matches the query;
generating a list of solution objects identified in the search of the plurality case objects and identified in the search of the plurality of solution objects;
ranking the solution objects in the list of solution objects based on the first and second-relevance scores; and
transferring the list of solution objects to the user system.

15. The computer method of claim 14, further comprising generating the query string by:
i) removing from the query:
words shorter than a first select length, words longer than a second select lengths, which is longer than the first select length, and/or stop words;

ii) stemming words and/or iii) performing bi-gram tokenization.

16. The method of claim 14, further comprising:

generating a case object for the query;

receiving a request from the user system for the generation of an association the case object for the query and a set of solution objects in the list of solution objects; and forming an association between the case object for the query and the set of solution objects in the list of solution objects.

17. The method of claim 16, further comprising providing for subsequent quires the case object for the query and the set of solution objects in the list of data objects.

18. A computer system comprising a server system configured to:

receive a query from a user system;

generate a query string based on the query;

search a plurality of case objects for case objects that substantially match the query string, wherein:

i) at least one of the case objects is associated with at least one solution object, ii) each of the case objects is associated with includes a query, and iii) each of the solution objects includes an answer to a query;

generate a first-relevance score for each of the solution objects that is associated with at least one of the case objects identified in the searching step;

search a plurality of solution objects for solution objects that substantially match the query string;

generate a second-relevance score for each of the solution objects that substantially matches the query;

generate a list of solution objects identified in the search of the plurality case objects and identified in the search of the plurality of solution objects;

rank the solution objects in the list of solution objects based on the first and second-relevance scores; and transfer the list of solution objects to the user system.

19. The computer system of claim 18, wherein the server system is configured to generate the query string by:

1) removing from the query:

words shorter than a first select length, words longer than a second select lengths, which is longer than the first select length, and/or stop words;

2) stem words and/or 3) perform bi-gram tokenization.

20. The computer system of claim 18, further comprising a user system communicatively coupled to the server system, wherein the user system is configured to generate the query and transfer the query to the server system, and receive the list of ranked solution objects from the server system.

21. The method of claim 18, further comprising a network configured to i) communicatively couple the user system and the server system, ii) transport the query from the user system to the server system, and iii) transport the list of ranked solution objects from the server system to the user system.

* * * * *